United States Patent [19]

Lindroth et al.

[11] 4,073,653
[45] Feb. 14, 1978

[54] PRINTING PASTE COMPOSITIONS CONTAINING SODIUM CELLULOSE SULFATE, AND PROCESSES THEREFOR

[75] Inventors: Thomas A. Lindroth, Spring Valley; Joseph S. Racciato, San Diego, both of Calif.

[73] Assignee: Merck & Co., Inc., Rahway, N.J.

[21] Appl. No.: 656,920

[22] Filed: Feb. 10, 1976

[51] Int. Cl.² ............................................. C09D 11/14
[52] U.S. Cl. ........................................ 106/26; 8/89 R; 8/91; 106/170; 106/173 R; 106/193 R; 252/8.6; 260/DIG. 38; 536/3; 536/59; 536/114
[58] Field of Search .................... 536/59; 106/26, 170, 106/173 R, 193 R; 252/8.6; 8/89, 91; 260/DIG. 38

[56] References Cited

U.S. PATENT DOCUMENTS

| 2,761,789 | 9/1956 | Locher et al. ................ 106/193 R |
| 2,884,332 | 4/1959 | Locher et al. ................ 106/193 R |
| 2,911,314 | 11/1959 | Armento et al. ................ 106/167 |
| 2,969,356 | 1/1961 | Touey et al. ........................ 536/59 |
| 3,077,373 | 2/1963 | Kerr ........................................ 536/59 |
| 3,084,990 | 4/1963 | Hoffman ...................... 106/193 R |
| 3,282,717 | 11/1966 | Kelley ................................ 106/205 |
| 3,427,176 | 2/1969 | Moriya .............................. 106/157 |
| 3,508,935 | 4/1970 | Bridgeford ......................... 106/26 |
| 3,609,377 | 9/1971 | Pettitt ............................... 106/194 |
| 3,624,069 | 11/1971 | Schweiger ........................... 536/59 |
| 3,743,526 | 7/1973 | Zwahlen ....................... 106/193 R |
| 3,765,832 | 10/1973 | Shelso et al. ......................... 8/91 |
| 3,778,282 | 12/1973 | Manier ........................ 106/193 R |
| 3,933,788 | 1/1976 | Kang et al. ........................... 536/1 |
| 3,960,832 | 6/1976 | Kang et al. ........................... 536/1 |

FOREIGN PATENT DOCUMENTS

| 804,309 | 2/1974 | Belgium ................................... 8/91 |
| 2,342,469 | 3/1974 | Germany ................................ 8/91 |
| 7,300,083 | 7/1973 | Netherlands ............................ 8/91 |

OTHER PUBLICATIONS

Modern Plastics, Nov., 1951, pp. 109, 110, 112, 114, 183 and 184.

Primary Examiner—Ronald W. Griffin
Attorney, Agent, or Firm—Donald J. Perrella; Julian S. Levitt

[57] ABSTRACT

Sodium cellulose sulfate can be used alone, or in combination with other natural or synthetic gums, as thickening agents for fabric printing paste compositions containing acid dyes. The printing paste is applied in the usual manner, and then the printed goods are heated. The sodium cellulose sulfate content of the paste, upon heating, fixes the acid dye on the printed goods, thereby eliminating the necessity of using acid or acid salts in printing pastes.

17 Claims, No Drawings

PRINTING PASTE COMPOSITIONS CONTAINING SODIUM CELLULOSE SULFATE, AND PROCESSES THEREFOR

BACKGROUND OF THE INVENTION

Many textile dyeing applications today utilize a continuous dyeing process; the woven textile goods, are printed with a printing paste composition containing dye, thickening agent and in the case of acid dyes, an acid or an acid salt to "fix" them into the textile fiber, and then are "aged" in a steamer, which cures the dye by treatment with hot (200°–220° F) steam. This steam treatment lasts for a few minutes up to about an hour. Optionally, the fabric can be printed, dried, and stored; then the stored fabric can be "aged" or steam-treated at the printer's convenience.

A problem of the prior art has been that the use of acids, such as formic or acetic, or acid generating salts, to fix the dye requires special handling procedures. Another problem is that some acids used in color fixation were incompatible with the thickening agent.

It is, therefore, an object of this invention to provide a novel thickening agent for printing compositions containing acid dyes, comprising sodium cellulose sulfate, alone, or in combination with other natural and synthetic gums. It is another object of this invention to provide an acid dye-containing printing paste which is stable, easily handled, and yet can be treated using normal equipment and techniques, with heated steam to fix the dye without addition of a separate acid-curing agent. These and other objects of the invention will become apparent upon further reading.

SUMMARY OF THE INVENTION

This invention now provides a printing paste composition which contains an acid dye, and sodium cellulose sulfate as a thickening agent, in addition to other components of a print paste. Upon treatment with the steam "ager", the sodium cellulose sulfate acts as an acid fixing agent, obviating the need for a separate acidic component for the printing paste.

One outstanding advantage to the use of sodium cellulose sulfate as both the thickening agent and the source for the acid dye fixing, is that there is no incompatibility problem between the dye print paste and the acid which can be applied separately, or together. One problem of the prior art had been that some acids used in color fixation were incompatible with the thickener gums used. Another advantage associated with the use of sodium cellulose sulfate is that there are no safety or environmental problems in its use, while free acids such as formic or acetic require special handling.

DETAILED DESCRIPTION

The sodium cellulose sulfate which is used in the practice of this invention is a water soluble cellulosic gum, having a degree of substitution (D.S.) of between 2 and 3, usually approximately 2.5. It is a cream colored semi-fibrous powder, generally available in mesh size of through 80 mesh. It is commercially available, in three viscosity ranges, < 5 to 5 cps, 150 cps, and 300 cps, all as measured in a 1% solution on a Brookfield viscometer at 25° C. It can be prepared, for instance, using the teaching of U.S. Pat. No. 3,609,377, issued Sept. 28, 1971.

The sodium cellulose sulfate can be utilized as the sole thickening agent in the desired printing paste, or it can be used in combination with one or more natural or synthetic gums. When it is used in combination with another gum or gums, it constitutes from about 10% to about 60% by weight of the total thickening agent blend.

The rest of the thickener blend, from about 90% to about 40%, can be one or more gums, chosen from the galactomannan gums, such as locust bean gum, guar gum, and the like; the alginates; or biosynthetic gums such as xanthan gum, produced by fermentation of the Xanthomonas bacteria family, or heteropolysaccharide gums productd by Azotobacter, especially *A. indicus* var. myxogenes, ATCC 21423, or the heteropolysaccharide gum produced by *Erwinia tahitica,* ATCC 21711.

These natural or biosynthetic gums are all known in the art and are widely available, generally in different grades or viscosities. All grades of gums are equally useful in forming the blend with sodium cellulose sulfate. It will be appreciated that use of different gums of differing viscosities will result in variation in the rheology of the final print paste. The rheology requirements of the paste are dependent on the dying equipment, type of fabric to be dyed, and complexity of the final dyed pattern, among others. One skilled in the art can select the final rheology by judicious choice of gum.

The gums mentioned above all have generally accepted composition. The heteropolysaccharide gum produced by *A. indicus* is further described in Canadian Patent 945,091; the heteropolysaccharide gum produced by *E. tahitia* is further described in French Patent No. 7,340,683. These gums will hereinafter be referred to by their generic names, S-7, and S-10, respectively.

Thickener combinations are made by blending together the individual gums in a dry mixing apparatus.

In the following discussions of mixtures, all components are chosen on a weight basis to make up 100%.

One preferred composition range of thickener gums is 20–60% sodium cellulose sulfate, 10–75% guar gum, 0–60% xanthan gum, 0–75% S-7 gum, and 0–75% S-10 gum.

Within the above combination, a particularly preferred composition is 30–50% sodium cellulose sulfate, 15–60% guar gum, and 10–55% xanthan gum. Some specific compositions within this range are: 30% sodium cellulose sulfate, 35% guar gum, and 35% xanthan gum; or 30% sodium cellulose sulfate, 55% guar gum, and 15% xanthan gum; 50% sodium cellulose sulfate, 25% guar gum, and 25% xanthan gum; or 30% sodium cellulose sulfate, 15% guar gum, and 55% xanthan gum.

Another preferred type of composition is 30–50% sodium cellulose sulfate, 10–30% guar gum and 20–60% heteropolysaccharide gum S-10. Some specific compositions which are particularly useful are 30% sodium cellulose sulfate, 15% guar gum, and 55% S-10 gum; 30% sodium cellulose sulfate, 35% guar gum, and 25% S-10 gum.

Another preferred type of composition is 30–50% sodium cellulose sulfate, 10–30% alginate, and 20–60% polysaccharide gum S-7. A specific composition within this range is 50% sodium cellulose sulfate, 25% sodium alginate, and 25% S-7 gum.

The sodium cellulose sulfate can also be employed as 30–50% of the thickener blend, with the other 50–70% being S-10, S-7, guar gum, xanthan gum or sodium alginate. In addition, 50% of the thickener blend can be sodium cellulose sulfate and two other gums employed in amounts of 25% each, the other gums being mixtures of xanthan gum and S-7; xanthan and S-10; guar and xanthan; algin and S-7; and algin and S-10.

It is understood that all the above represent preferred choices only within the broad limits of this invention, and illustrate combinations which have particularly desirable rheological properties in the final printing paste.

The thickener, whether it is 100% sodium cellulose sulfate, or 10-60% sodium cellulose sulfate in combination with one or more natural or synthetic gums, is used in an amount between 0.25 and 4% of the weight of the final printing paste, and generally between about 1% to about 2%. Those knowledgeable in the printing art are aware of the compounding of printing pastes. Generally, the dye is used in an amount of from about 0.2 to 6.0%, pasted up with 1-4% of a solvent such as thiodiethyleneglycol, benzyl alcohol, or the like, and dissolved with 40-20% boiling water. This resulting solution is thickened with a 50% aqueous solution of the thickener blend described above.

This printing paste is prepared and is particularly useful for textile printing, including flat goods and carpets. A material which is printed with a formulation including this new thickener is usually dried and then steamed for about 1 hour at no more than 3 pounds pressure. During this latter steaming step, the sodium cellulose sulfate thickener fixes the dye.

This invention is illustrated by the following examples.

EXAMPLE 1

A thickener blend of 30% sodium cellulose sulfate, 15% guar gum and 55% xanthan gum is prepared by mixing the indicated gums. The final blend is a tan powder, soluble in cold water.

A dye paste is formulated using the above blend, 1.25% by weight, 1% benzyl alcohol, 2% Napthol Green B (an acid dye, CI Acid Green 1), and water to 100%. This dye is printed on nylon loop carpet stock using conventional equipment. Excellent printing qualities are observed. Following printing, the carpet is steamed at 215° F for 10 minutes. Color development and print fixation are quite good.

EXAMPLE 2

A printing paste containing 0.3% (acid Red 151) and 1.5% of a blend of sodium cellulose sulfate:algin:-heteropolysaccharide S-7 in 50:25:25 percent concentration is printed on 100% nylon tricot. Following printing, the tricot is divided into 4 parts which are steamed for 0.0, 1.0, 2.0 and 5.0 minutes, respectively, at 212° F. Each print is then washed out separately using equal volumes of water. The absorbance of the wash water is measured using a spectrophotometer. Optical density is 1.22 at 0 minutes, 0.10 at 1 minute, 0.054 at 2 minutes, and 0.018 at 5 minutes, at 520 nm. This test shows that lower amounts of dye are found in the washout as the steam-generated acid developed the dye. A control paste without sodium cellulose sulfate but otherwise identical (0.3% dye and 1.5% of algin and heteropolysaccharide S-7 in 50:50 percent concentration) is used to treat a similar nylon tricot. The optical density is 1.35 at 0 minute, 0.14 at 1 minute, 0.054 at 2 minutes and 0.04 at 5 minutes at 520 nm.

EXAMPLE 3

Seven printing pastes containing 1% blend of 30% sodium cellulose sulfate and 70% xanthan gum and 1% Acid Yellow 151 dye are formulated. Seven different grades and viscosities of sodium cellulose sulfate are used in the formulations. The pH of the printing pastes is varied from 7.6 to 7.8. The pastes are printed on 100% nylon tricot and 100% nylon carpet, steamed for 10 minutes at 212° F, washed, dried and visually inspected for color yield, dye penetration and fine line control. Execellent properties are found in all prints, and no differences are observable.

EXAMPLE 4

A carpet printing paste containing 1% of a sodium cellulose sulfate:guar gum:S-10 gum blend (30:15:55), 1% benzyl alcohol and 1% Acid Blue 25 dye in water is tested on nylon carpet. Fine line control is good and a bright, clean color results, when the carpet is steamed for 10 minutes at 212° F after printing.

EXAMPLE 5

A flat goods printing paste containing 1% of a sodium cellulose sulfate:guar gum:xanthan gum (30:35:35), 1% benzyl alcohol, and 1% Acid Violet 9 dye is printed on nylon tricot. Very good color development and excellent control of fine line is observed after printing and steam treatment at 212° F for 5 minutes.

What is claimed is:

1. An aqueous printing paste containing an acid dye and a thickener composition containing from about 10% to about 60% sodium cellulose sulfate, and from about 90% to about 40% of at least one member selected from locust bean gum, guar gum, a soluble alginate gum, xanthan gum, S-10 heteropolysaccharide gum and S-7 heteropolysaccharide gum, the amount of alginate, if present, being from 10-30%.

2. The printing paste of claim 1 wherein the thickener composition is
   20-60% sodium cellulose sulfate;
   10-75% guar gum;
   0-60% xanthan gum;
   0-75% S-7 heteropolysaccharide gum; and
   0-75% S-10 heteropolysaccharide gum; the total being 100%.

3. The printing paste of claim 2 wherein the thickener composition is
   30-50% sodium cellulose sulfate;
   15-60% guar gum; and
   10-55% xanthan gum; the total being 100%.

4. The printing paste of claim 3 wherein the thickener composition is
   30% sodium cellulose sulfate;
   35% guar gum; and
   35% xanthan gum.

5. The printing paste of claim 3 wherein the thickener composition is
   30% sodium cellulose sulfate;
   15% guar gum; and
   55% xanthan gum.

6. The printing paste of claim 3 wherein the thickener composition is
   50% sodium cellulose sulfate;
   25% guar gum; and
   25% xanthan gum.

7. The printing paste of claim 3 wherein the thickener composition is
   30% sodium cellulose sulfate;
   50% guar gum; and
   15% xanthan gum.

8. The printing paste of claim 2 wherein the thickener composition is
30–50% sodium cellulose sulfate;
10–30% guar gum; and
20–60% S-10 heteropolysaccharide gum; the total being 100%.

9. The printing paste of claim 8 wherein the thickener composition is
30% sodium cellulose sulfate;
15% guar gum; and
55% S-10 heteropolysaccharide gum.

10. The printing paste of claim 8 wherein the thickener composition is
30% sodium cellulose sulfate;
35% guar gum;
25% S-10 heteropolysaccharide gum.

11. The printing paste of claim 1 wherein the thickener composition is
30–50% sodium cellulose sulfate;
10–30% soluble alginate;
20–60% S-7 heteropolysaccharide gum; the total being 100%.

12. The printing paste of claim 11 wherein the thickener composition is
50% sodium cellulose sulfate;
25% sodium alginate
25% S-7 heteropolysaccharide gum.

13. The printing paste of claim 1 wherein the thickener composition is 30–50% sodium cellulose sulfate and correspondingly 70–50% of at least one member selected from S-10 heteropolysaccharide gum, S-7 heteropolysaccharide gum, guar gum, xanthan gum, and sodium alginate, the amount of sodium alginate, if present, being from 10–30%.

14. The process of modifying the rheological character of an aqueous print paste formulation system containing an acid dye, which comprises adding thereto between about 0.25% to 4%, based on the total amount of the formulation, of a thickener composition according to claim 1.

15. The process of claim 14 wherein the thickener is a mixture of gums comprising
20–60% sodium cellulose sulfate;
10–75% guar gum;
0–50% xanthan gum;
0–75% S-7 heteropolysaccharide gum; and
0–75% S-10 heteropolysaccharide gum; the total being 100%.

16. The process of claim 14 wherein the thickener is a mixture of gums comprising
30–50% sodium cellulose sulfate;
10–30% soluble alginate; and
20–60% S-7 heteropolysaccharide gum; the total being 100%.

17. The process of claim 14 wherein the thickener is a mixture of 30–50% sodium cellulose sulfate and 70–50% of at least one member selected from S-10 heteropolysaccharide gum, S-7 heteropolysaccharide gum, guar gum, xanthan gum, or sodium alginate; the total being 100%.

* * * * *